(12) United States Patent
Moriya

(10) Patent No.: US 6,501,605 B2
(45) Date of Patent: Dec. 31, 2002

(54) LENS HOLDING FRAME AND LENS BARREL

(75) Inventor: Masami Moriya, Kawasaki (JP)

(73) Assignee: Nikon Corporation, Tokyo (JP)

( * ) Notice: Subject to any disclaimer, the term of this patent is extended or adjusted under 35 U.S.C. 154(b) by 25 days.

(21) Appl. No.: 09/732,007

(22) Filed: Dec. 8, 2000

(65) Prior Publication Data

US 2002/0126398 A1 Sep. 12, 2002

(30) Foreign Application Priority Data

Dec. 10, 1999 (JP) .......................................... 11-351435

(51) Int. Cl.$^7$ .......................... G02B 7/02; G03B 17/00; B29D 11/00
(52) U.S. Cl. ........................ 359/819; 359/808; 359/811; 396/529; 264/1.1
(58) Field of Search ................................. 359/811, 819, 359/820, 808; 396/529; 264/1.1

(56) References Cited

U.S. PATENT DOCUMENTS

| 5,493,452 A | | 2/1996 | Hoshino et al. ............. 359/819 |
| 5,781,351 A | * | 7/1998 | Murakami et al. .......... 359/808 |
| 5,808,817 A | * | 9/1998 | Miyamoto et al. .......... 359/819 |

* cited by examiner

*Primary Examiner*—Loha Ben
(74) *Attorney, Agent, or Firm*—Oliff & Berridge PLC

(57) ABSTRACT

A lens holding frame that secures and holds a lens, includes: a lens holding frame main body; a plurality of lens receptacle portions projecting inward at the lens holding frame main body and formed at the lens holding frame main body so as to position the lens along a direction of an optical axis of the lens by placing the lens in contact along the direction of the optical axis; and a plurality of injection portions formed inward at the lens holding main body through which an adhesive for bonding at least the lens and the lens receptacle portions is injected.

20 Claims, 12 Drawing Sheets

LENS HOLDING FRAME AND LENS BARREL

INCORPORATION BY REFERENCE

The disclosure of the following priority application is herein incorporated by reference: Japanese Patent Application No. 11-351435 filed Dec. 10, 1999.

BACKGROUND OF THE INVENTION

1. Field of the Invention

The present invention relates to a lens holding frame that holds a lens used in a camera, a video camera or the like.

2. Description of the Related Art

A lens is secured to a lens holding frame in the prior art through caulking or with a retaining ring which is provided as a separate part. Alternatively, the lens is secured with an adhesive in recent years to achieve miniaturization and reduced weight, a cost reduction and the like.

Japanese Laid-Open Patent Publication No. 4-166904 (U.S. Pat. No. 5,493,452) discloses a lens barrel in the prior art in which an adhesive is used. Specifically, Japanese Laid-Open Patent Publication No. 4-166904 (U.S. Pat. No. 5,493,452) discloses an example in which an adhesive is allowed to penetrate through the capillary action in a lens holding barrel that does not require any lens eccentricity adjustment or lens inclination adjustment. A lens holding barrel such as that disclosed in this publication is suitable for use in conjunction with a lens provided at a position at which the eccentricity and the inclination of the lens used at the lens barrel do not greatly affect the overall lens performance of the photographic lens such as the resolving power.

However, the lens holding barrel disclosed in Japanese Laid-Open Patent Publication No. 4-166904 (U.S. Pat. No. 5,493,452) cannot be employed when the eccentricity and the inclination of the lens greatly affect the overall lens performance of the photographic lens such as the resolving power or when the lens eccentricity and the lens inclination are to be adjusted in the final adjustment of the entire photographic lens, and instead, a lens holding frame with an adjustment margin is used.

FIG. 11 shows a lens holding frame 111 and a lens barrel 110 in which a lens is bonded in a conventional manner by allowing for an adjustment margin. At the lens barrel 110, the lens holding frame 111 and a lens 112 are bonded with an adhesive 113 shown in FIG. 12.

The lens holding frame 111 holds the lens 112 and is provided to mount the lens 112 at a lens main body (not shown). The lens holding frame 111 includes a cylindrical portion 111a which cylindrically encloses and holds the external circumference of the lens 112 and three lens receptacle portions 111b constituting contact portions where it comes in contact with the lens to position the lens 112 along the direction of the optical axis and provided over equal intervals, and it may be prepared by injection-molding polycarbonate.

FIG. 12A presents a sectional view through O—O in FIG. 11 and FIG. 12B presents a sectional view through P—P in FIG. 11. At the lens barrel 110 in the prior art, after the photo-curing adhesive 113 such as a visible light and ultraviolet light setting adhesive is allowed to fill and penetrate the space between the lens holding frame 111 and the lens 112 through capillary action, the adhesive 113 is caused to set by irradiating setting light to bond and secure the lens 112 at the lens holding frame 111. Unless the adhesive 113 is allowed to completely fill and penetrate the lens receptacle portions 111b, the required bonding strength cannot be achieved for the lens holding frame 111 and the lens barrel 110 in the prior art structured as described above. Accordingly, the adhesive 113 is normally used in sufficient quantity to fill and penetrate the lens receptacle portions 111b.

However, the lens holding frame 111 and the lens barrel 110 in the prior art pose a problem in that even a slight change in the quantity of the adhesive 113 that is applied, the application speed, the viscosity of the adhesive 113 or the like or a positional misalignment of the tip of the nozzle of the dispenser used for adhesive application may result in the adhesive 113 spreading out into the range of the effective diameter of the lens 112, thereby causing loss of precision with regard to the lens position, ghosting, poor external appearance and the like.

If, on the other hand, the quantity of the adhesive 113 that is applied is reduced, for instance, in order to prevent the adhesive 113 from spreading out, problems occur in that the adhesive does not fully penetrate the gap between the lens 112 and the lens holding frame 111 and in that the bonding strength is lowered.

These problems will occur even more readily in the lens holding barrel disclosed in Japanese Laid-open Patent Publication No. 4-166904 (U.S. Pat. No. 5,493,452) mentioned earlier. Namely, since the positional regulation of the external circumference of the lens is achieved with the lens holding frame in this type of lens holding barrel, the adhesive is not allowed to enter the contact portions. Thus, it is necessary to inject the adhesive into the extremely small gaps around the contact portions (a 0.25 mm gap, since the diameter is bigger by only 0.5 mm in the example disclosed in Japanese Laid-Open Patent Publication No. 4-166904 (U.S. Pat. No. 5,493,452)). Consequently, the adhesive can be prevented from spreading out only through rigorous control of the quantity of the adhesive to be injected and the injection speed, which makes for an extremely difficult work process and a complex and time-consuming dispenser adjustment.

In addition, it is necessary to use an extra fine dispenser nozzle corresponding to the size of the gap during this process, which tends to lead to clogging and deformation at the tip of the nozzle to result in poor operability.

Furthermore, since the lens is allowed to drop well into the cylindrical portion of the lens holding barrel in the example disclosed in Japanese Laid-Open Patent Publication No. 4-166904 (U.S. Pat. No. 5,493,452), the direction along which the nozzle can be inserted is restricted to compromise the operability and also the position of the nozzle of the automatic machine is restricted. Thus, it is difficult to adopt the disclosure of the publication in an actual process.

SUMMARY OF THE INVENTION

An object of the present invention is to provide a lens holding frame and a lens barrel in which the adhesive is not allowed to spread out into the range of the lens effective diameter to achieve good operability and stable and sufficient bonding strength.

In order to attain the above object, a lens holding frame according to the present invention that secures and holds a lens, comprises: a lens holding frame main body; a plurality of lens receptacle portions projecting inward at the lens holding frame main body and formed at the lens holding frame main body so as to position the lens along a direction of an optical axis of the lens by placing the lens in contact along the direction of the optical axis; and a plurality of injection portions formed inward at the lens holding main body through which an adhesive for bonding at least the lens and the lens receptacle portions is injected.

In this lens holding frame, it is preferred that the injection portions are each provided with a reservoir portion where some of the adhesive is collected.

Also, it is preferred that the injection portions each assume a structure with a wide intake side where the adhesive is injected and a narrow inner side. In this case, it is preferred that the injection portions each include an inclined surface having a wide intake side where the adhesive is injected and gradually narrowing further inward. Furthermore, it is preferred that the inclined surface includes a reservoir portion where some of the adhesive is collected.

Also, it is preferred that the injection portions are set at positions adjacent to the lens receptacle portions.

Also, it is preferred that the injection portions are provided on a side where the lens receptacle portions come into contact with the lens. In this case, it is preferred that the injection portions are formed so as to allow the adhesive which has been injected to penetrate gaps between the lens and the lens receptacle portions due to gravity and capillary action while any excess adhesive remains at the injection portions when the lens is set at the top of the lens receptacle portions by aligning the direction of the optical axis of the lens with a direction of gravity.

Also, it is preferred that the injection portions are provided on a side opposite from a side where the lens receptacle portions come into contact with the lens. In this case, it is preferred that the injection portions are formed so as to allow the adhesive which has been injected to penetrate gaps between the lens and the lens receptacle portions due to gravity and capillary action while any excess adhesive remains at the injection portions when the lens is set at bottoms of the lens receptacle portions by aligning the direction of the optical axis of the lens with a direction of gravity.

A lens holding frame according to the present invention that secures and holds at least two lenses that are a first lens and a second lens, comprises: a lens holding main body; a plurality of lens receptacle portions projecting inward at the lens holding frame main body, positioned between the two lenses and formed at the lens holding frame main body so as to position the two lenses along a direction of an optical axis of the two lenses by allowing the two lenses to come in contact along the direction of the optical axis; a plurality of first injection portions formed inward at the lens holding frame main body, through which an adhesive for bonding at least the first lens and surfaces of the lens receptacle portions located toward the first lens is injected; and a plurality of second injection portions formed inward at the lens holding frame main body further toward the second lens and further outward relative to the first injection portions, through which an adhesive for bonding at least the second lens and surfaces of the lens receptacle portions toward the second lens is injected.

A lens barrel according to the present invention comprises: a lens; and a lens holding frame that secures and holds the lens. And the lens holding frame comprises: a lens holding frame main body; a plurality of lens receptacle portions projecting inward at the lens holding frame main body and formed at the lens holding frame main body so as to position the lens along a direction of an optical axis of the lens by placing the lens in contact along the direction of the optical axis; and a plurality of injection portions formed inward at the lens holding main body through which an adhesive for bonding at least the lens and the lens receptacle portions is injected.

In this lens barrel, it is preferred that a portion of the adhesive is collected at the injection portions.

DESCRIPTION OF THE PREFERRED EMBODIMENTS (First Embodiment)

Figure 1:
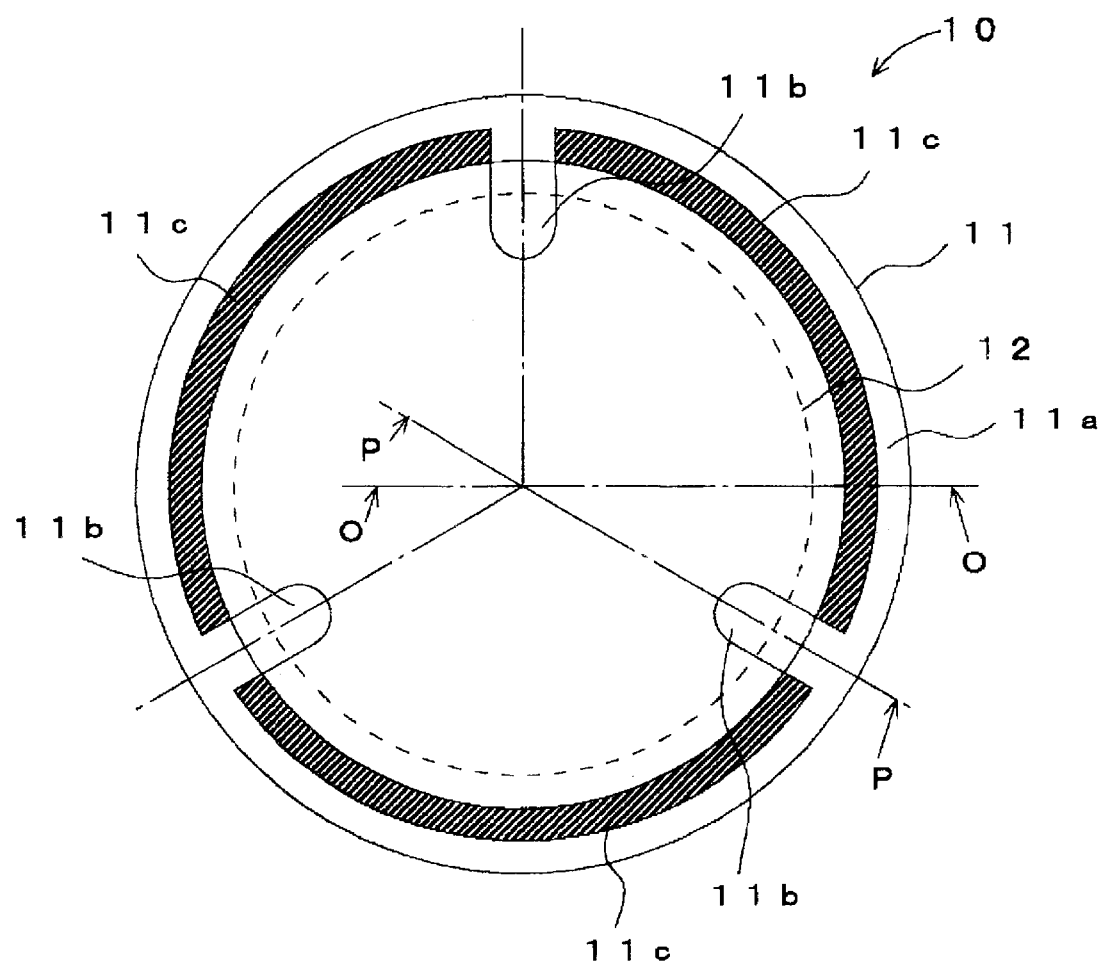
FIG. 1 is a top view of the lens holding frame 11 and the lens barrel 10 in a first embodiment of the present invention.

FIG. 1 is a top view of a lens holding frame 11 and a lens barrel 10 in the first embodiment of the present invention. The lens barrel 10 includes a lens holding frame 11 and a lens 12 which are bonded together by an adhesive 13 shown in FIG. 2.

The lens 12 is one of numerous lenses used in the photographic optical system of the camera and is a convex lens in this embodiment.

The lens holding frame 11 holds the lens 12 and is provided to mount the lens 12 at a lens main body (not shown). The lens holding frame 11 includes a cylindrical portion 11a which cylindrically encloses and holds the external circumference of the lens 12, three lens receptacle portions 11b constituting contact portions where it comes in contact with the lens to position the lens 12 along the direction of the optical axis and provided over equal intervals and injection portions 11c through which the adhesive 13 is injected, and it may be prepared by injection-molding polycarbonate.

Figure 2A:
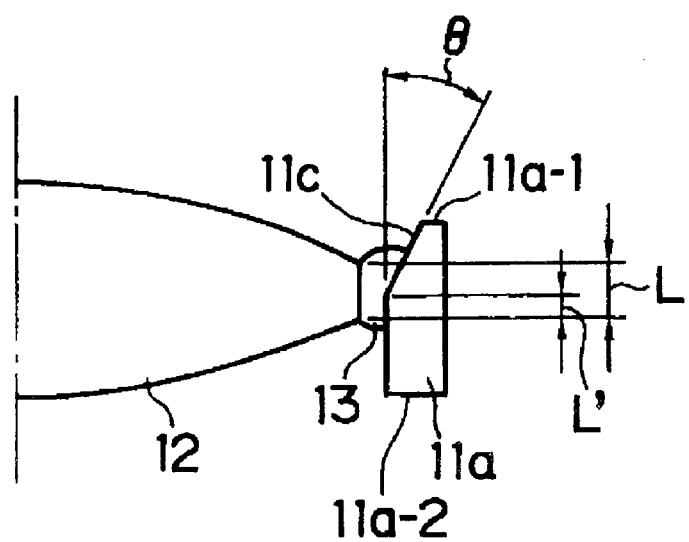
FIG. 2A presents a sectional view through O—O in FIG. 1.
Figure 2B:
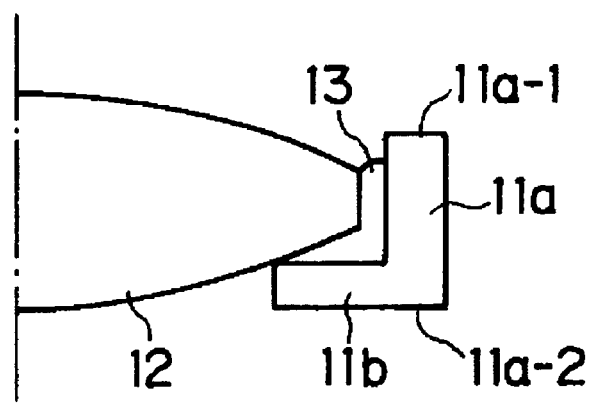
FIG. 2B presents a sectional view through P—P in FIG. 1.
Figure 3:
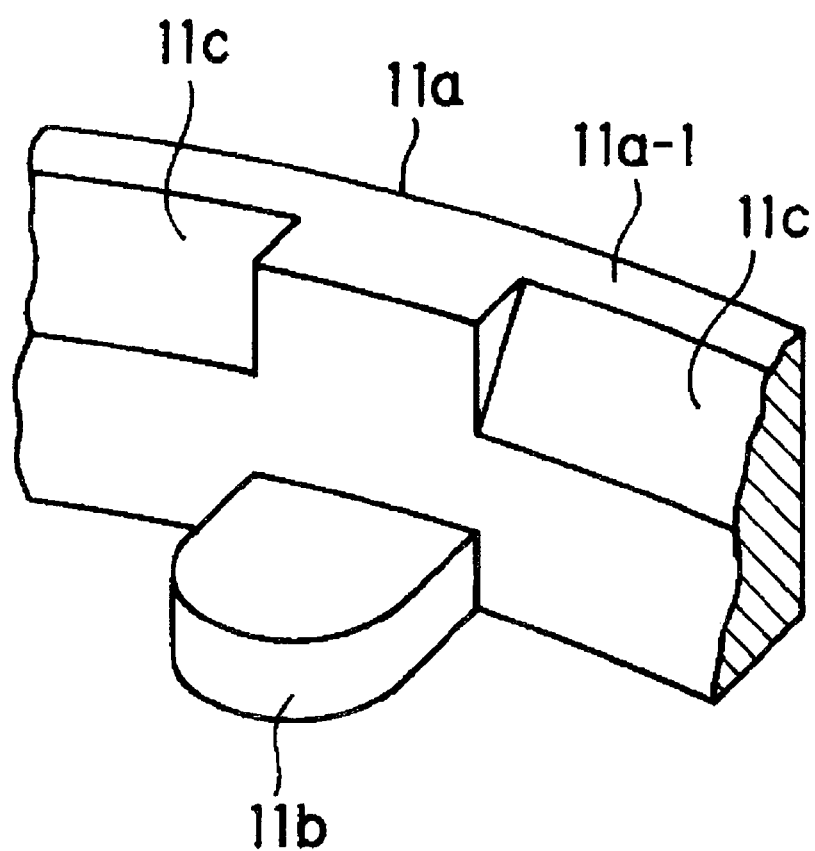
FIG. 3 is a perspective showing an area around a lens receptacle portion 11b of the lens holding frame 11 in an enlargement.

FIG. 2A presents a sectional view through O—O in FIG. 1 and FIG. 2B presents a sectional view through P—P in FIG. 1. FIG. 3 is a perspective of an area around a lens receptacle portion 11b of the lens holding frame 11 in an enlargement.

The lens receptacle portions 11b, which are provided as contact portions where the lens holding frame 11 comes in contact with the lens to determine the position of the lens 12 along the direction of the optical axis, are constituted as three projected portions provided at the inner wall of an end 11a-2 of the cylindrical portion 11a over equal intervals. While it is not absolutely necessary to provide them at three positions set in equal intervals, it is a desirable to set them in equal intervals in view of balance and the ease of dimensional management.

The injection portions 11c are each constituted of an inclined surface through which the adhesive 13 is injected and are located at an end 11a-1 of the cylindrical portion 11a (on the side where the lens receptacle portions 11b are allowed to come into contact with the lens) which is opposite from an end 11a-2 of the cylindrical portion 11a on the side where the lens receptacle portions 11b are provided. In addition, the injection portion 11c is set along the inner wall of the lens holding frame 11 excluding the lens receptacle portions 11b. The cross sectional shape of the injection portions 11c may be selected freely within ranges 0<L'<L and $\theta \leqq 60°$ with L, L' and $\theta$ defined as shown in FIG. 2A. In this embodiment, it constitutes a portion of the inner surface of a cone (a conical shape).

The adhesive 13 is used to bond the lens holding frame 11 and the lens 12 and is constituted of visible light and ultraviolet light setting adhesive. The adhesive 13 is injected into the injection portions 11c by using a dispenser or the like (not shown).

The actual bonding process is implemented after a positioning process in which the eccentricity and the inclination of the lens 12 relative to the lens holding frame 11 are adjusted, by placing the tip of the nozzle of the dispenser near the injection portion 11c and injecting the adhesive 13 into the area to allow it to accumulate. At this time, the nozzle tip should be set at any position within the range of the injection portions 11c. The adhesive 13, which has been accumulating at the injection portion 11c, is allowed to fill and penetrate the gap between the lens holding frame 11 and the lens 12 as well as the gap between the lens receptacle portion 11b and the lens 12 due to gravity and capillary action. Since any excess adhesive 13 remains at the injection portion 11c, no adhesive spreads out into the range of the effective diameter of the lens 12.

It is to be noted that the optical axis of the lens 12 is set along the direction of gravity during the bonding process. Alternatively, the eccentricity and the inclination of the lens 12 may be adjusted after the adhesive 13 fills and penetrates the gaps during the work procedure.

When the gaps are completely filled and penetrated with the adhesive 13, ultraviolet light is irradiated on the adhesive 13 to set the adhesive 13, thereby securing the lens 12 to the lens holding frame 11.

As described above, since the adhesive injection portions 11c are provided at the top of the cylindrical portion of 11a of the lens holding frame 11 in the first embodiment, the work process is facilitated while ensuring that the adhesive is not allowed to spread out into the range of the effective diameter of the lens.

(Second Embodiment)

Figure 4:
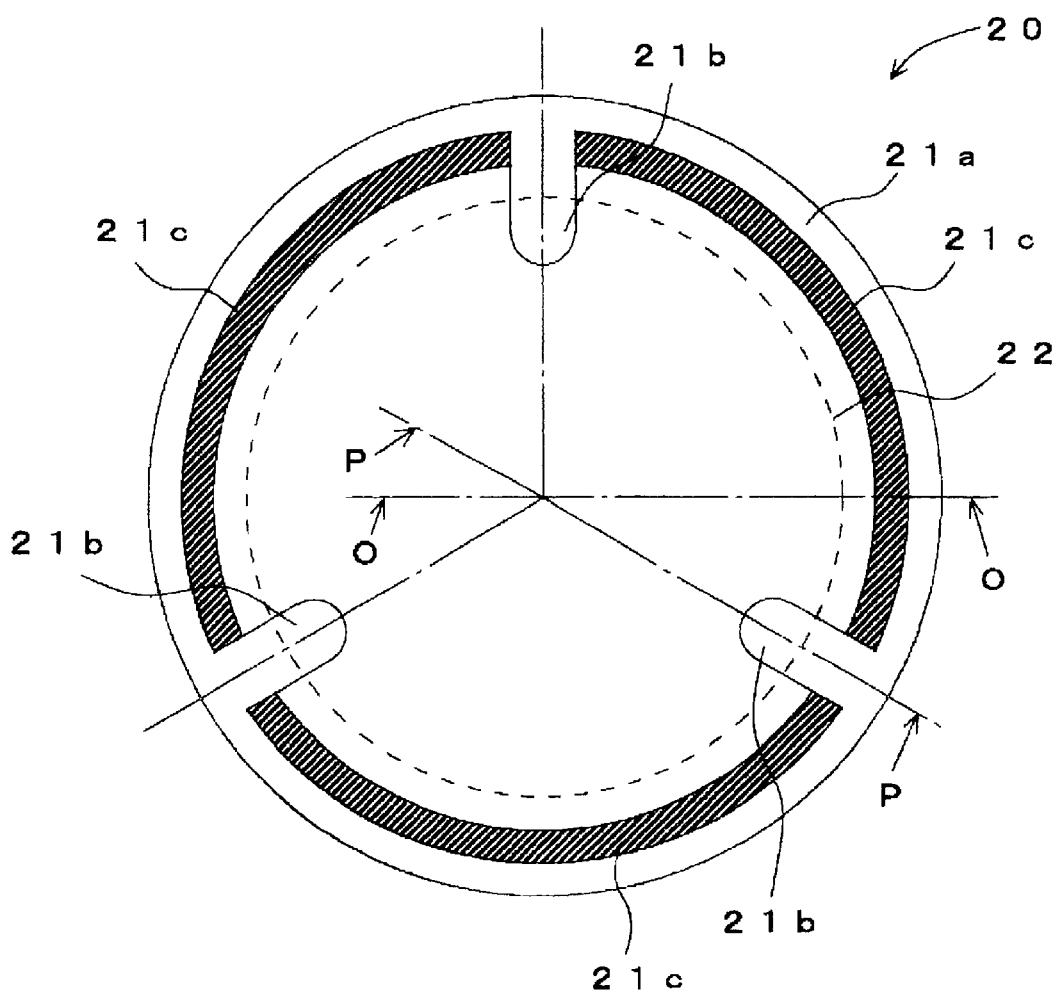
FIG. 4 is a top view of the lens holding frame 21 and the lens barrel 20 in a second embodiment of the present invention.
Figure 5A:
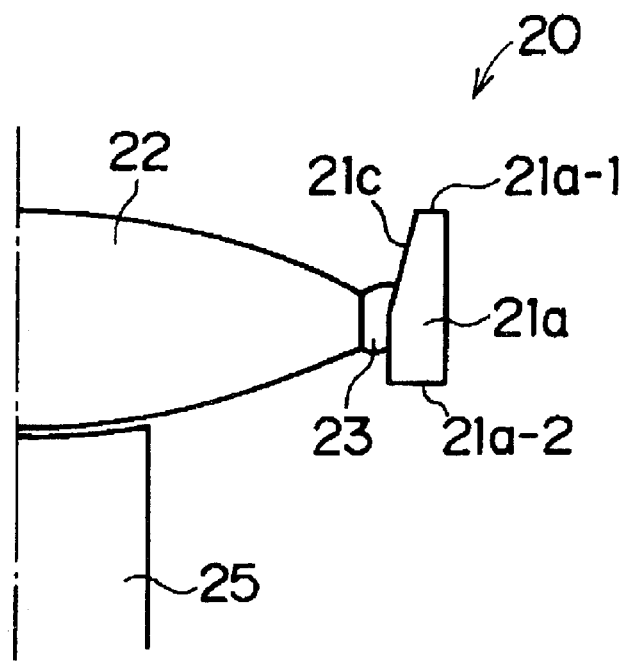
FIG. 5A presents a sectional view through O—O in FIG. 4.
Figure 5B:
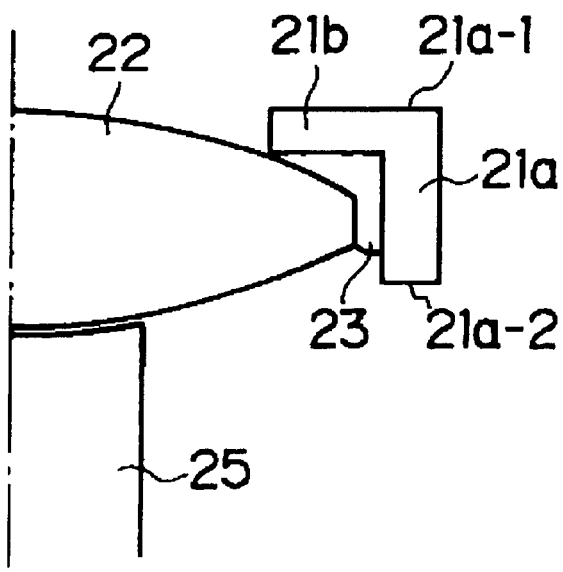
FIG. 5B presents a sectional view through P—P in FIG. 4.
Figure 6:
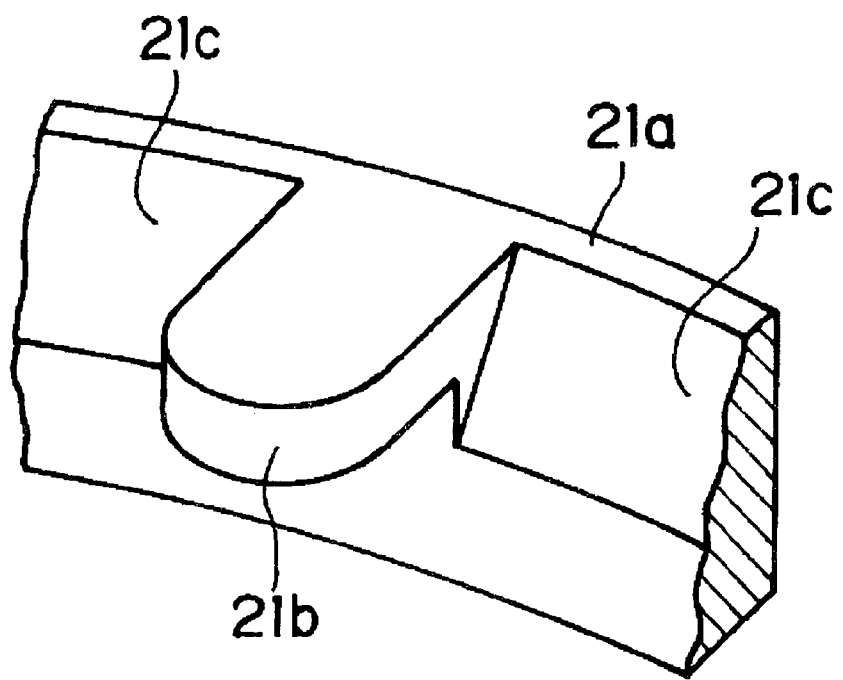
FIG. 6 is a perspective showing an area around a lens receptacle portion 21b of the lens holding frame 21 in an enlargement.

FIG. 4 is a top view of a lens holding frame 21 and a lens barrel 20 in the second embodiment of the present invention. FIG. 5A presents a sectional view through O—O in FIG. 4 and FIG. 5B presents a sectional view through P—P in FIG. 4. In FIGS. 5A and 5B, the assembly is mounted on a lens receptacle base 25. FIG. 6 is a perspective of an area around a lens receptacle portion 21b of the lens holding frame 21 in an enlargement. It is to be noted that a repeated detailed explanation of portions identical to those in the first embodiment is omitted as appropriate in the following explanation of the subsequent embodiments.

The lens receptacle portions 21b, which constitute contact portions where the lens holding frame 21 comes into contact with a lens 22 to determine the position of the lens 22 along the direction of the optical axis, are identical to those in the first embodiment.

Injection portions 21c are each constituted of an inclined surface through which an adhesive 23 is injected and are located at positions reversed from the positions assumed by the injection portions in the first embodiment. In other words, they are located at an end 21a-1 (on the side opposite from the side where the lens receptacle portions 21b are allowed to come into contact with the lens) of a cylindrical portion 21a on the side where the lens receptacle portions 21b are provided. In addition, they are set along the inner wall of the lens holding frame 21 excluding the lens receptacle portions 21b. The cross sectional shape that may be assumed by the injection portions 21c is as explained in reference to the first embodiment.

Unlike in the first embodiment, the actual bonding process is implemented by setting the lens holding frame 21 on the lens 22. The lens 22 is placed on the lens receptacle base 25 during this process. Subsequently, work steps similar to those in the first embodiment may be implemented.

The present invention in the second embodiment, in which the injection portions 21c are provided at positions reversed from the positions assumed by the injection portions in the first embodiment as described above, may be effectively adopted when the injection portions 21c cannot be provided along the direction assumed in the first embodiment due to a positional restriction in relation to another lens barrel, a process-related restriction or the like, to facilitate the work process and to ensure that the adhesive is not allowed to spread out into the range of the effective diameter of the lens. In addition, by combining the second embodiment with the first embodiment, an improvement in the assembly process can be achieved. This point is explained below in reference to the third embodiment.

(Third Embodiment)

Figure 7:
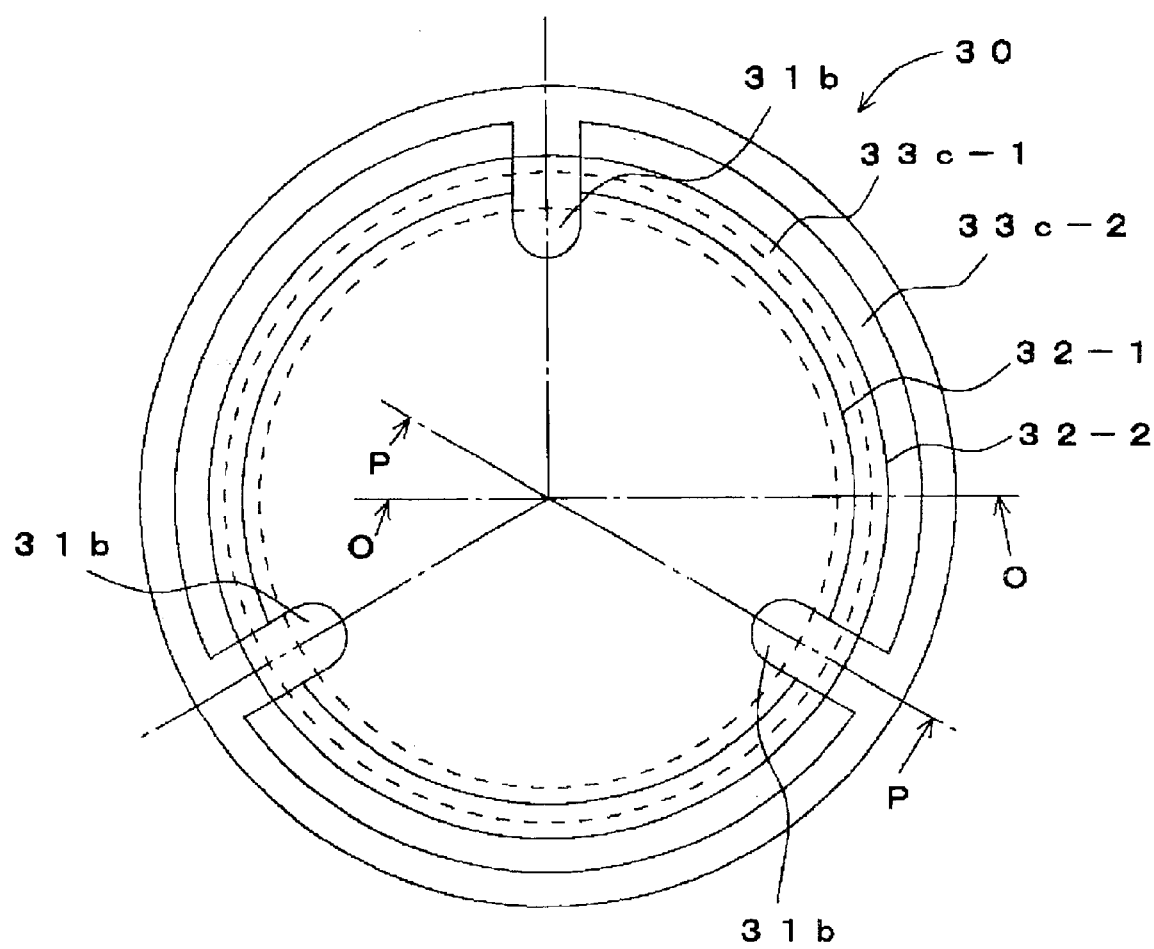
FIG. 7 is a top view of the lens holding frame 31 and the lens barrel 30 in a third embodiment of the present invention.
Figure 8A:
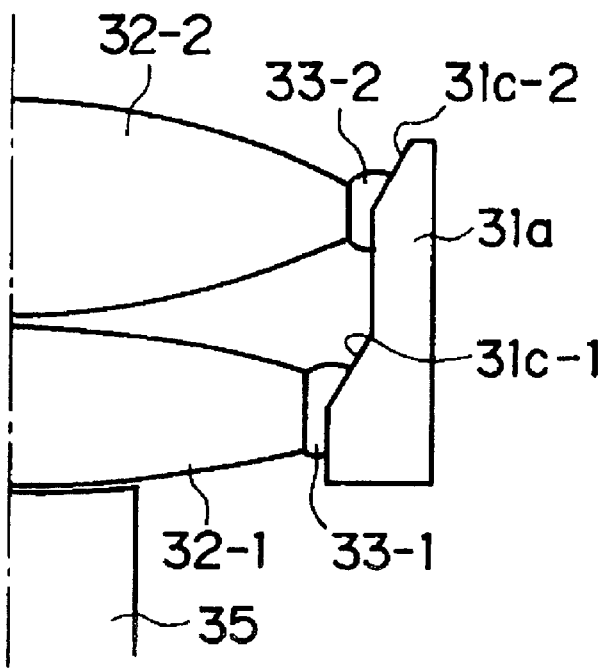
FIG. 8A presents a sectional view through O—O in FIG. 7.
Figure 8B:
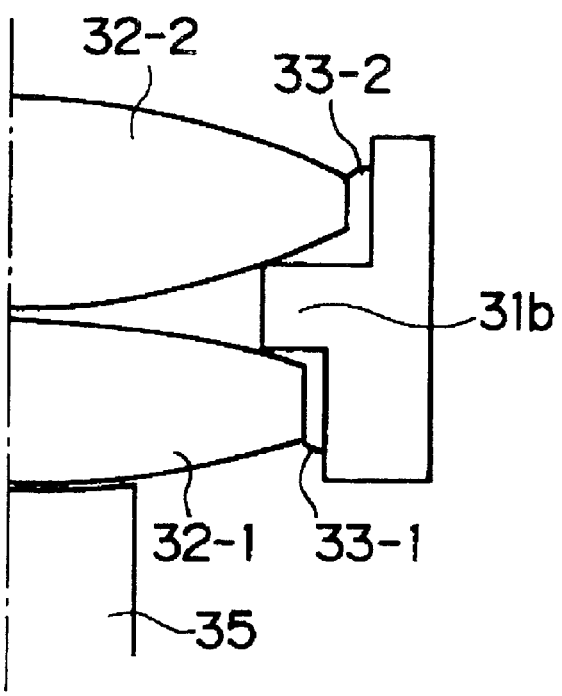
FIG. 8B presents a sectional view through P—P in FIG. 7.
Figure 9:
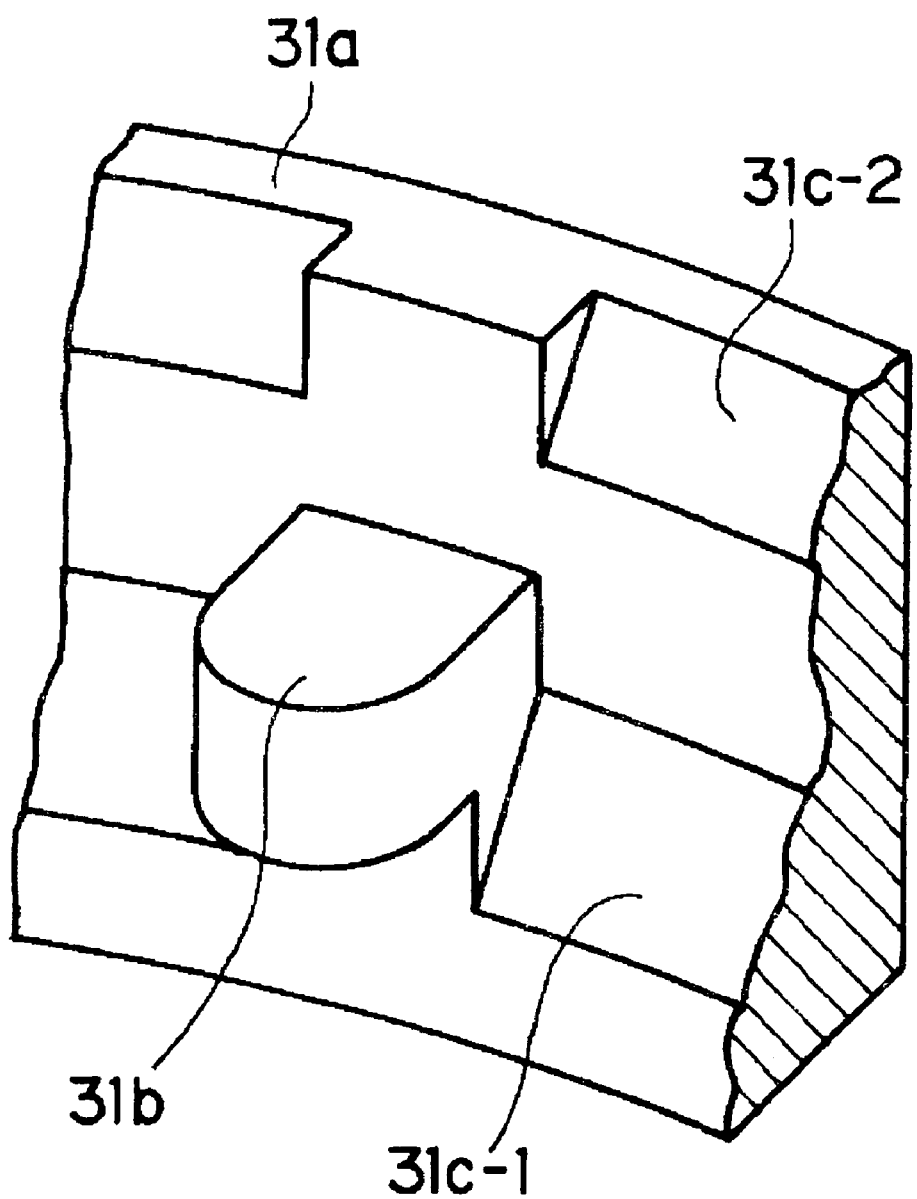
FIG. 9 is a perspective showing an area around a lens receptacle portion 31b of the lens holding frame 31 in an enlargement.

FIG. 7 is a top view of a lens holding frame 31 and a lens barrel 30 in the third embodiment of the present invention. FIG. 8A presents a sectional view through O—O in FIG. 4 and FIG. 8B presents a sectional view through P—P in FIG. 7. In FIGS. 8A and 8B, the assembly is mounted on a lens receptacle base 35. FIG. 9 is a perspective of an area around a lens receptacle portion 31b of the lens holding frame 31 in an enlargement.

In the third embodiment, the first embodiment and the second embodiment are implemented in combination. Namely, the second embodiment is adopted for a lower lens 32-1 in FIG. 8 (31b, 31c-1, 33-1 and 35), whereas the first embodiment is adopted for an upper lens 32-2 (31b, 31c-2, 33-2).

During the bonding process, the adhesive is charged and is allowed to penetrate first at the lower lens 32-1 as in the second embodiment. Then, without performing an ultraviolet light irradiation and reversing the lens holding frame 31, the upper lens 32-2 is allowed to drop in immediately, and the adhesive is charged and allowed to penetrate as in the first embodiment. In this state in which the adhesive has not yet set, the upper and lower lenses are allowed to move. Consequently, the eccentricity and the inclination can be adjusted by moving the two lenses 32-1 and 32-2 relative to the lens holding frame 31. After the adjustments are completed, ultraviolet light is irradiated onto the adhesive 33-1 and 33-2 to set it.

The third embodiment, which allows two different lenses to be bonded and secured after they are adjusted at the same time, is particularly effective when adopted in an optical system in which the relative eccentricity and inclination of the two lenses greatly affect the performance. In addition, even when it is adopted in an application other than such an optical system, the adhesive is prevented from spreading out when holding two lenses and the process of lens mounting through bonding can be implemented without having to reverse the lens holding frame 31, to facilitate the bonding process itself.

(Variations)

The present invention is not limited to the embodiments explained above and allows for numerous variations and modifications which are equally within the scope of the present invention.

(1) While an explanation is given in reference to the embodiments in which the lenses are convex lenses, the present invention is not limited to these particulars and the lenses may be concave lenses, meniscus lenses or the like. In addition, while the shape of a lens projected along the direction of the optical axis is round in the examples explained above, the present invention is not restricted by these details, and the shape of the projected lens may be any other shape such as a rectangle or a barrel shape.

Figure 10:
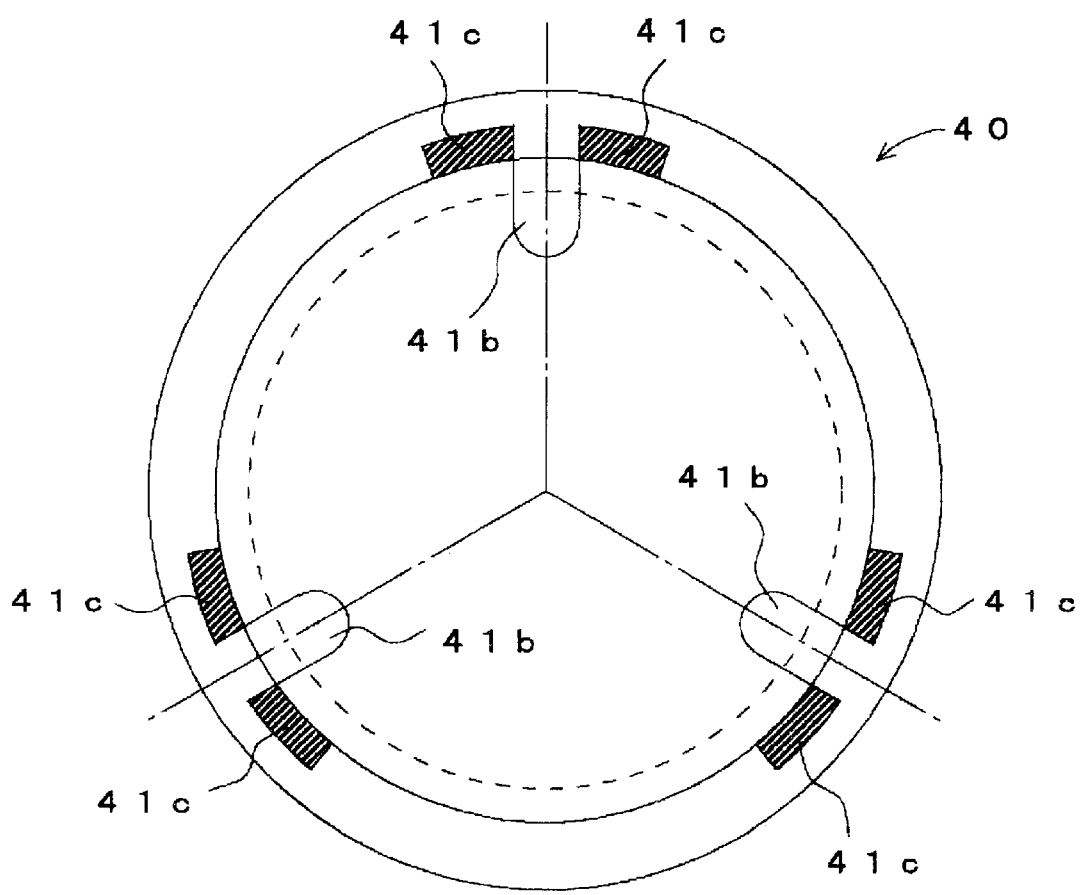
FIG. 10 illustrates a variation that may be adopted at the injection portions.
Figure 11:
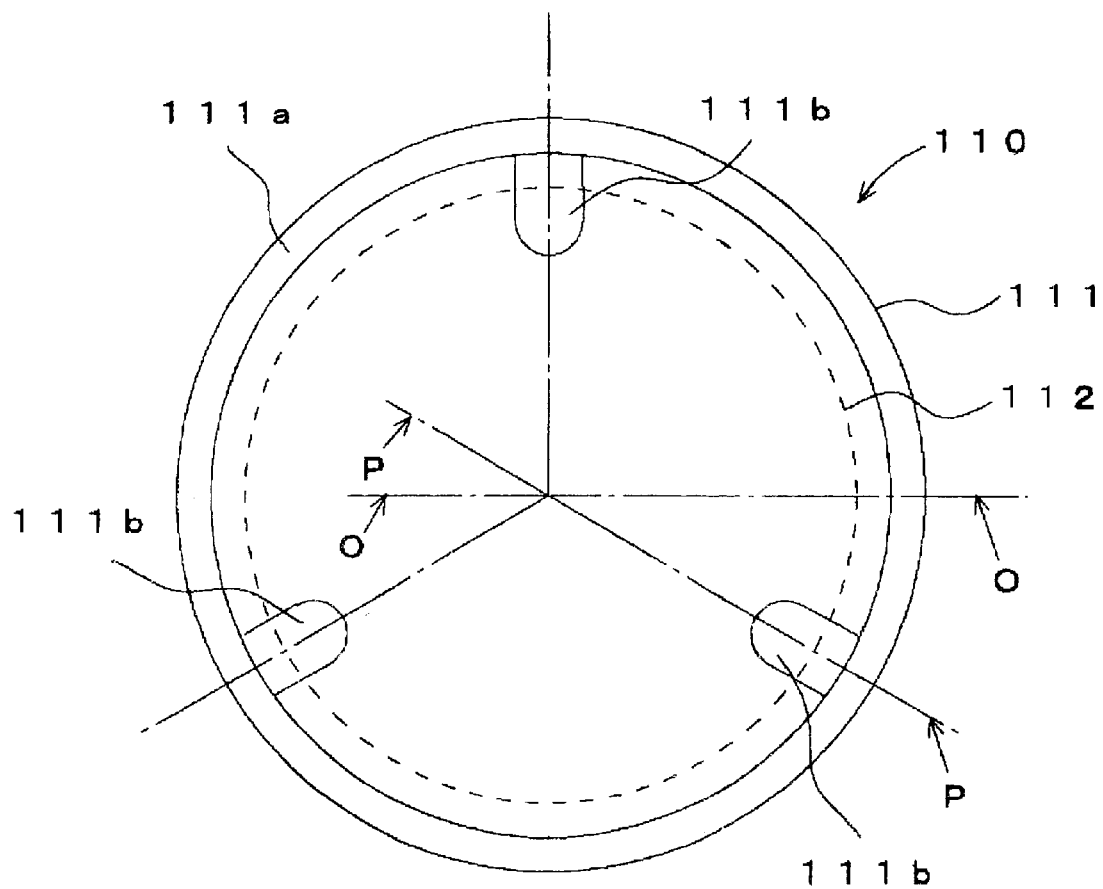
FIG. 11 illustrates a lens holding frame 111 and a lens barrel 112 achieved through conventional bonding which allows for an adjustment margin.
Figure 12A:
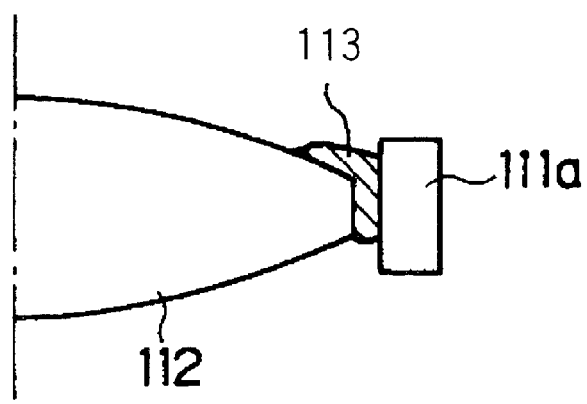
FIG. 12A presents a sectional view through O—O in FIG. 11.
Figure 12B:
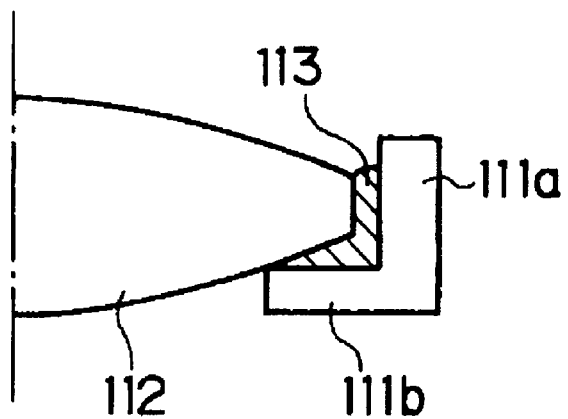
FIG. 12B presents a sectional view through P—P in FIG. 11.

(2) While an example in which the injection portion is provided along the entire circumference excluding the lens receptacle portions in each of the embodiments, the present invention is not limited to this example, and injection portions 41c may be provided, for instance, only in the vicinity of lens receptacle portions 41b as in a lens frame 40 shown in FIG. 10, or they may be provided at areas distanced from the lens receptacle portions. In addition, the cross sectional shape of the injection portions may vary at different locations.

(3) While an explanation is given above in reference to the embodiments on an example in which a visible light and ultraviolet light setting adhesive is used, the present invention is not limited to this example, and the adhesive may instead be a thermal setting adhesive, an anaerobic setting adhesive, a double fluid setting adhesive or an instant adhesive and the basic constituent of the adhesive may be a silicone, an epoxy resin or cyanoacrylate.

(4) While the three lens receptacle portions are provided in equal intervals and have a round shape at their front ends in each of the embodiments explained earlier, the quantity and the shape of the lens receptacle portions in the embodiments represents only an example, and four or more lens receptacle portions may be provided and they may assume a shape with a curved surface conforming to the contour of the lens.

(5) While an explanation is given above in reference to the embodiments on an example in which the adhesive is charged and allowed to penetrate over the entire circumference, the present invention is not limited to this example, and the adhesive may be charged and allowed to penetrate only at specific positions.

(6) While an explanation is given above in reference to the embodiments on an example in which a lens holding frame that allows the eccentricity and the inclination of a lens to be adjusted is utilized, the present invention is not limited to this example, and it may be adopted in conjunction with a lens holding frame that regulates the eccentricity and the inclination by letting the lens be dropped into the lens holding frame and thus, does not require such adjustments.

(7) While an explanation is given above in reference to the embodiments on an example in which the injection portions are each constituted of an inclined surface, the injection portions may assume a structure other than an inclined surface. For instance, the injection portions may adopt a staged structure. In other words, the present invention may be adopted in all types of structures, as long as the port through which the adhesive is injected extends over a wide range to ensure that the gap between the lens and the lens holding frame is filled and penetrated with the adhesive due to gravity and capillary action and any excess adhesive is allowed to remain at the injection portion.

(8) The lens holding frame and the lens barrel in each of the embodiments may be utilized in a telescope, binoculars, a microscope or the like instead of a camera or a video camera. Namely, they may be utilized in all types of optical systems that use lenses.

What is claimed is:

1. A lens holding frame that secures and holds a lens, comprising:

a lens holding frame main body;

a plurality of lens receptacle portions projecting inward at said lens holding frame main body and formed at said lens holding frame main body so as to position the lens along a direction of an optical axis of the lens by contacting the lens in the direction of the optical axis;

a plurality of injection portions formed inward at said lens holding frame main body through which an adhesive for bonding at least the lens and said lens receptacle portions is injected; and said injection portions being set at positions adjacent to said lens receptacle portions and extending between adjacent ones of the lens receptacle portions by a circumferential distance that is greater than a circumferential width of the lens receptacle portions.

2. A lens holding frame according to claim 1, wherein: said injection portions are each provided with a reservoir portion where excessive adhesive collects.

3. A lens holding frame according to claim 1, wherein: said injection portions each have a wide intake side where said adhesive is injected, and a narrow inner side.

4. A lens holding frame according to claim 3, wherein: said injection portions each include an inclined surface having a wide intake side where said adhesive is injected, and gradually narrowing further inward.

5. A lens holding frame according to claim 4, wherein: said inclined surface includes a reservoir portion where excessive adhesive collects.

6. A lens holding frame according to claim 1, wherein: said injection portions are provided on a side where said lens receptacle portions come into contact with the lens.

7. A lens holding frame according to claim 6, wherein: said injection portions are formed so as to allow said adhesive which has been injected to penetrate gaps between the lens and said lens receptacle portions due to gravity and capillary action while any excess adhesive remains at said injection portions when the lens is set at a top of said lens receptacle portions by aligning the direction of the optical axis of the lens with a direction of gravity.

8. A lens holding frame according to claim 1, wherein said injection portions do not extend entirely between said adjacent ones of said lens receptacle portions.

9. A lens holding frame according to claim 1, wherein said injection portions do not overlap said lens receptacle portions.

10. A lens holding frame that secures and holds a lens, comprising:
a lens holding frame main body;
a plurality of lens receptacle portions projecting inward at said lens holding frame main body and formed at said lens holding frame main body so as to position the lens along a direction of an optical axis of the lens by contacting the lens in the direction of the optical axis; and
a plurality of injection portions formed inward at said lens holding frame main body through which an adhesive for bonding at least the lens and said lens receptacle portions is injected, wherein:
said injection portions are provided on a side opposite from a side where said lens receptacle portions come into contact with the lens.

11. A lens holding frame according to claim 10, wherein:
said injection portions are formed so as to allow said adhesive which has been injected to penetrate gaps between the lens and said lens receptacle portions due to gravity and capillary action while any excess adhesive remains at said injection portions when the lens is set at bottoms of said lens receptacle portions by aligning the direction of the optical axis of the lens with a direction of gravity.

12. A lens holding frame that secures and holds at least two lenses that are a first lens and a second lens, comprising:
a lens holding frame main body;
a plurality of lens receptacle portions projecting inward at said lens holding frame main body, positioned between the two lenses and formed at said lens holding frame main body so as to position the two lenses along a direction of an optical axis of said two lenses by contacting said two lenses in the direction of the optical axis;
a plurality of first injection portions formed inward at said lens holding frame main body, through which an adhesive for bonding at least the first lens and surfaces of said lens receptacle portions located toward the first lens is injected; and
a plurality of second injection portions formed inward at said lens holding frame main body further toward the second lens and further outward relative to said first injection portions, through which an adhesive for bonding at least the second lens and surfaces of said lens receptacle portions located toward said second lens is injected from a same direction as the adhesive that is injected through the first injection portions with respect to the optical axis of said two lenses.

13. A lens barrel, comprising:
a lens; and
a lens holding frame that secures and holds the lens, wherein
said lens holding frame comprises:
a lens holding frame main body;
a plurality of lens receptacle portions projecting inward at said lens holding frame main body and formed at said lens holding frame main body so as to position the lens along a direction of an optical axis of the lens by contacting the lens in the direction of the optical axis;
a plurality of injection portions formed inward at said lens holding frame main body through which an adhesive for bonding at least the lens and said lens receptacle portions is injected; and
said injection portions being set at positions adjacent to said lens receptacle portions and extending between adjacent ones of said lens receptacle portions by a circumferential distance that is greater than a circumferential width of the lens receptacle portions.

14. A lens barrel according to claim 13, wherein a portion of said adhesive is collected at said injection portions.

15. A lens holding frame according to claim 13, wherein said injection portions do not extend entirely between said adjacent ones of said lens receptacle portions.

16. A lens holding frame according to claim 13, wherein said injection portions do not overlap said lens receptacle portions.

17. A lens holding frame that secures and holds a lens, comprising:
a lens holding frame main body;
a plurality of lens receptacle portions projecting inward at said lens holding frame main body and formed at said lens holding frame main body so as to position the lens along a direction of an optical axis of the lens by contacting the lens in the direction of the optical axis; and
a plurality of injection portions formed inward at said lens holding frame main body through which an adhesive for bonding at least the lens and said lens receptacle portions is injected, wherein:
said injection portions each include an inclined surface having a wide intake side where said adhesive is injected and gradually narrowing further inward; and
the inclined surface has an angle equal to or smaller than 60 degrees relative to the direction of the optical axis of the lens.

18. A lens holding frame that secures and holds a lens, comprising:
a lens holding frame main body;
a plurality of lens receptacle portions projecting inward at said lens holding frame main body and formed at said lens holding frame main body so as to position the lens along a direction of an optical axis of the lens by contacting the lens in the direction of the optical axis;
a plurality of injection portions formed inward at said lens holding frame main body through which an adhesive for bonding at least the lens and said lens receptacle portions is injected; and
said injection portions being set at positions adjacent to said lens receptacle portions, being wider than said lens receptacle portions with regard to a circumferential direction of said lens holding frame, and each having a wide intake side where said adhesive is injected and a narrow inner side.

19. A lens holding frame according to claim 18, wherein:
said injection portions each include an inclined surface having a wide intake side where said adhesive is injected, and gradually narrowing further inward.

20. A lens holding frame according to claim 18, wherein said injection portions do not overlap said lens receptacle portions.

* * * * *